Oct. 9, 1956
H. A. KRAUSE
2,766,356
ELECTRICAL SWITCH MECHANISM
Filed Dec. 9, 1953
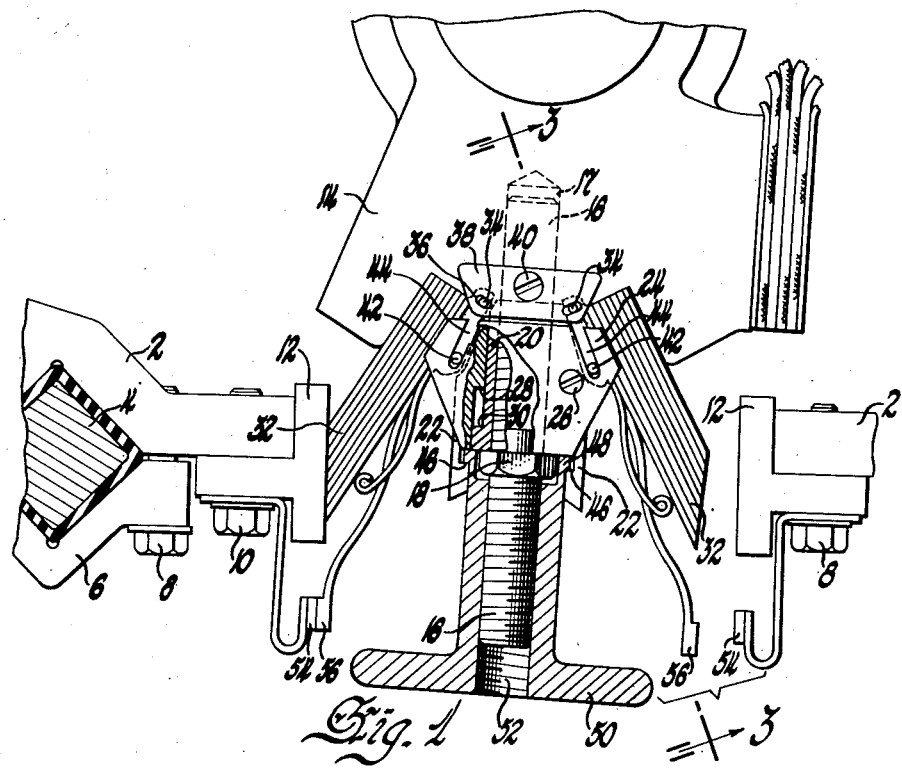
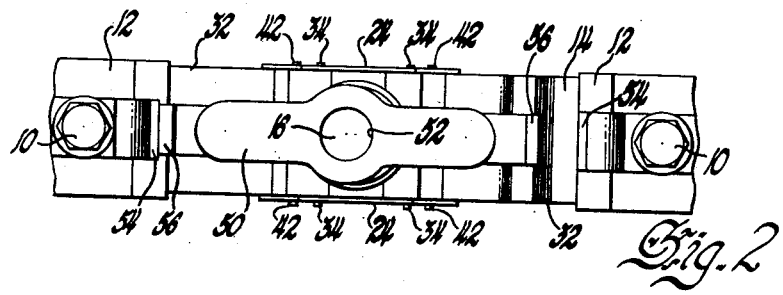
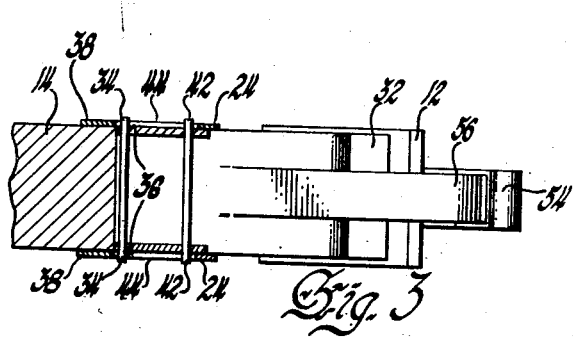
INVENTOR
Herbert A. Krause
BY
J. E. Thorpe
ATTORNEY United States Patent Office 2,766,356
Patented Oct. 9, 1956

2,766,356

ELECTRICAL SWITCH MECHANISM

Herbert A. Krause, Brookfield, Ill., assignor to General Motors Corporation, Detroit, Mich., a corporation of Delaware Application December 9, 1953, Serial No. 397,153

5 Claims. (Cl. 200—166)

This invention relates generally to electrical switch mechanisms and more particularly to electrical switch mechanisms used in conjunction with the cam switches on electrically powered vehicles equipped with dynamic braking and is a further modification of the switch mechanism shown in a copending application U. S. Serial Number 305,017, Electrical Switch Mechanism, Weide. The invention will be described in connection with the cam switches used on diesel electric locomotives. It should be understood, however, as the description proceeds that the invention is not limited to electro-motive power only but has a much wider field of application.

In the diesel electric field it is well known that a main generator is driven by a diesel engine to supply electrical current to a plurality of traction motors geared to axles that turn the driving wheels of a locomotive. It is also well known that dynamic braking may be accomplished on these locomotives by means of a cam switch which when thrown simultaneously connects the traction motors across dynamic braking resistor grids.

The cam switch generally constitutes a pneumatically operated rotary multiple pole switch provided with terminals with which the main generator, the fields of the traction motors and the armatures of the traction motors are directly or indirectly connected. Also forming a part of the cam switch are sets of stationary contacts for each traction motor which may be connected in power or in braking by means of the movable contacts on the rotating portion.

In multiple pole switches such as the cam switch described above, there often arrive occasions when it is desirable to prevent the completion of only one of the several circuits normally closed by such a switch. For example, if a traction motor on a locomotive should become defective and no longer be capable of supplying motive power, it would become most urgent to isolate such a mtor from the power circuit connecting the main generator and the traction motors together or its dynamic braking circuit to prevent the possibility of short circuiting and to relieve the resulting drag on the other traction motors.

It therefore becomes an object of this invention to provide a switching mechanism to be used in combination with a multiple pole switch and the circuits normally closed by the multiple pole switch which will prevent the completion of one of said circuits when said multiple pole switch is closed.

It is a further object of this invention to provide on an electrically powered locomotive the novel combination of a cam switch used to place the traction motors of the locomotive across dynamic braking grids and a manually accessible motor cut-out switch on each pole compartment of the cam switch which when operated serves to isolate a traction motor from the power circuit or dynamic braking circuit of the locomotive.

It is a more specific object of this invention to provide a manually rotatable handle which in combination with a novel cam mechanism will retract a set of contacts of a multiple pole multiple throw switch to prevent completion of one of several circuits normally closed by said switch.

It is a further object of this invention to provide a motor cut-out switch for the cam switch of a locomotive which is simple and inexpensive to manufacture and will readily adapt itself to equipment currently in use.

In the drawings:

Fig. 1 is a top view of one set of stationary contacts of a cam switch showing the movable contacts attached to the rotary portion of the switch with the new means for retracting the movable contacts.

Fig. 2 is a view in elevation of a pole compartment of the cam switch illustrating the handle which may be rotated for retracting the movable contacts.

Fig. 3 is a section taken on line 3—3 of Fig. 1 and shows how the laminated movable contacts are provided with pivoting and camming pins for retracting the movable contacts.

Referring now to the accompanying figures, a pair of oppositely disposed stationary contact carriers 2 for the cam switch of a locomotive are shown. These contact carriers 2 are fastened to vertical insulated members 4 by means of brackets 6 and studs 8. Secured to the carriers 2 by studs 10 are contact tips 12. Interposed between the contact tips 12 is a bearing block 20. The bearing block 20 is secured to a rotatable or movable contact carrier portion 14 of the cam switch by a nut 18 and a threaded stud 16 threaded into a hole 17 tapped therein.

The bearing block 20 provides a slidable bearing support for a pair of oppositely disposed cam carriers 22 which are secured on opposite sides thereof and maintained in spaced relationship about the block 20 by means of a pair of oppositely disposed cam plates 24 secured to the cam carriers 22 as by screws 26.

Movement of the cam carriers 22 on the bearing block 20 away from the rotatable portion 14 is limited by means of shoulders 28 and 30 on the cam carrier and bearing block, respectively. The rotatable portion 14, which as has already been mentioned constitutes the rotatable contact carrier, is provided with a pair of laminated contacts 32.

The laminated contacts 32 are pivotally attached to the rotatable contact carrier 14 by means of small pins 34, secured to one corner thereof, which pivotally reside in elongated slots 36 provided in a pair of oppositely disposed plates 38 secured to contact carrier 14 as by screws 40. It will be observed from the drawing that in the normal operating position shown laminated contacts 32 and contact carrier 14 are normally wedged into close contact with each other along flat surfaces in a manner tending to prevent contacts 32 from pivoting about pins 34. To obviate this difficulty slots 36 in plates 38, as already described, are elongated .

The laminated contacts 32, in addition to pins 34, are also provided with pins 42 secured on the same side thereof but removed longitudinally therefrom. These pins 42 movably reside in angularly extending slots 44 in the cam plates 24 which, as already mentioned, are carried by cam carriers 22. The cam carriers 22 at their outer ends are provided with grooves 46 which engage a flange or shoulder 48 provided on the shank end of an operating handle 50. The operating handle is internally threaded as at 52 so that it will turn on the threaded stud 16.

To protect the main contacts 12 and 32 of the switch against harmful arcing, small easily replaceable contact sets 54, 56 are provided which lead the main contacts during closing thereof and lag behind the main contacts during opening thereof.

The operation of the cam switch, including the new retracting means for the movable contacts 32, is as follows:

The rotatable member 14 is shifted back and forth by a suitable driving mechanism for the entire cam switch. When this driving mechanism moves the rotatable member 14, the contacts 12 and 32 are urged together alternately to complete one or another of a set of main circuits through the cam switch. If, for some reason, it should be desirable to prevent the completion of this set of circuits during operation of the cam switch, the handle 50 may be turned in a counter-clockwise direction. Because of the threads 52 and the threaded stud 16 turning of the handle 50 in a counter-clockwise direction will cause the handle 50 with its shoulder 48 to move away from the movable contact carrier 14. Since the shoulder 48 is in the grooves 46 on the cam carriers 22, cam carriers 22 in turn will be moved away from the movable contact carrier 14, carrying with them the cam plates 24.

By reason of the angular inwardly extending slots 44 movement of the cam plates 24 away from contact carrier 14 will cause the pins 42 and laminated contacts 32 to be pivoted about pins 34 and cammed inwardly or toward each other and away from the stationary contacts 12. The contacts 32 will continue to be cammed inwardly, pivoting about pins 34, until the shoulders 28 and 30 abut each other after which no further movement of cam carriers 22 away from contact carrier 14 is possible. It will be appreciated, however, that with the rotatable portion 14 of the cam switch in the position shown, the movable contacts 32, when cammed inwardly as described above, will no longer engage either of the stationary contacts 12 thereby rendering that portion of the cam switch ineffective to complete an electrical circuit even though the cam switch is in an operating position.

If it should be desired to reset the contacts to operate in a normal manner, the operating handle 50 is turned in a clockwise direction. Turning of handle 50 in a clockwise direction causes flange 48 and, consequently, cam carriers 22 and carrier plates 24 to move toward carrier 14. It wil be noted that the cam carriers 22 are wedge-shaped at one end thereof so that as they engage laminated contacts during movement toward carrier 14, the laminated contacts are forced toward stationary contacts 12 about pivot pins 34. By providing these wedge-shaped portions on cam carriers 22 and elongating the slots 36 so that pins 34 can move laterally therein, movement of cam carriers 22 to their extreme retracted position as shown in the drawing will tightly wedge laminated contacts 32 against contact carrier 14 thereby assuring proper positioning of laminated contacts 32 for normal operation and also that laminated contacts will make good electrical contact with carrier 14.

I claim:

1. An electrical switch comprising a stationary contact, a rotatable contact carrier, a movable contact pivotally attached to said carrier, said carrier being limitedly back and forth rotatable to move said movable contact into and out of engagement with said stationary contact and means to move said movable contact out of engagement with said stationary contact when said contact carrier is in a limit position to cause the movable contact to engage said stationary contact, including a pin attached to said movable contact at a point removed from where said movable contact is pivotally attached to said carrier, a cam plate movably attached to said contact carrier having a cam surface engageable with said pin, a threaded stud secured to said contact carrier, a handle threaded to said stud and rotatable thereon, and means operatively connecting said cam plate to said handle which, upon turning in one direction, causes said movable contact to move away from said stationary contact and toward said stud.

2. An electrical switch comprising a pair of oppositely disposed stationary contacts, a rotary contact carrier comprising an electrical conducting portion of said switch, a pair of movable contacts pivotally supported on said carrier and interposed between said stationary contacts, said carrier being limitedly rotatable back and forth to cause each of said movable contacts to alternately engage and disengage with one of said stationary contacts when at the outer limits of its movement, means to retract said movable contacts to prevent engagement of said movable contacts with said stationary contacts when said carrier is so limitedly rotated to the outer limits of its movement, including a threaded stud secured to said contact carrier between said movable contacts, pins secured to said movable contacts remote from where said movable contacts are pivotally supported on said carrier, oppositely disposed cam plates having camming slots engageable with said pins, an operating handle threaded to said stud and turnable thereon, said handle being operatively connected to said cam plates so that, upon turning thereof, said plates are moved outwardly along said stud thereby causing said pins and said movable contacts to move toward said stud and away from said stationary contacts, and means to wedge said movable contacts against said carrier to insure good electrical conduction therebetween comprising wedges interposed between said stud and said movable contacts and connected to said handle so that upon turning opposite to the first mentioning thereof said wedges are moved toward said carrier.

3. An electrical switch including a stationary contact, a movable contact carrier, contact means pivotally fastened to said carrier, said carrier being shiftable to move said contact means into and out of engagement with said stationary contact, said carrier having a limiting position determined by other than engagement between said contact and contact means in which said contact means normally engages said contact and means to move said contact means out of engagement with said stationary contact when said carrier is in said position comprising a pin secured to said contact means removed from where said contact means is pivotally fastened to said carrier, a plate having a camming slot therein in which said pin movably resides, a threaded stud secured to said cam carrier, bearing means secured by said stud and a nut thereon to said carrier, a cam carrier movably supported on said bearing means and having said cam plate secured thereto, and an operating handle operatively connected to said cam carrier and having threads turnable on the threads on said stud for moving said cam plate along said stud away from said carrier to thereby move said contact means toward said stud and away from said stationary contact.

4. An electrical switch including a pair of oppositely disposed stationary contacts, a movable contact carrier with contact means movably attached thereto, said contact carrier being shiftable to opposed limiting positions to cause said contact means to engage and disengage said stationary contacts and means independent of the shifting of said carrier to disengage said contacts and contact means when said carrier is in either of said positions normally adapted to cause engagement of said contacts and said contact means comprising oppositely disposed cam plates and cam pins associated with said contact means, a threaded stud secured to said contact carrier and an internally threaded handle turnable on said studs and in operating engagement with said cam plates to move said cam plates away from said contact carrier and said contact means away from said stationary contacts.

5. An electrical switch comprising a stationary contact, a movable contact carrier, a movable contact movably attached to said carrier and movable with said contact carrier into and out of engagement with said stationary contact, and means to change the position of said movable contact relative to said contact carrier so that said movable contact does not engage said stationary contact when said carrier is in a position to normally cause said movable contact to engage said stationary contact including a first cam surface associated with said movable contact, a threaded portion on said carrier, a handle turnable on said threaded portion, a second cam surface associated with said handle and engageable with said first cam surface to cam said first cam surface and the movable contact associated therewith on turning of said handle.

References Cited in the file of this patent

UNITED STATES PATENTS

| | | |
|---|---|---|
| 1,276,110 | Rasmussen | Aug. 20, 1918 |
| 1,909,783 | McWhirter | May 16, 1933 |
| 2,059,023 | Perry | Oct. 27, 1936 |